(12) United States Patent
Presler-Marshall

(10) Patent No.: US 7,284,093 B2
(45) Date of Patent: Oct. 16, 2007

(54) SELF-TUNING CACHE

(75) Inventor: Martin Joseph Clayton Presler-Marshall, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 350 days.

(21) Appl. No.: 10/759,410

(22) Filed: Jan. 16, 2004

(65) Prior Publication Data
US 2005/0160225 A1 Jul. 21, 2005

(51) Int. Cl.
G06F 12/00 (2006.01)

(52) U.S. Cl. ............ 711/126; 711/119; 711/171; 711/172

(58) Field of Classification Search .......... 711/118, 711/119, 120, 126, 170, 171, 172
See application file for complete search history.

(56) References Cited

U.S. PATENT DOCUMENTS 4,315,312 A    2/1982   Schmidt
5,394,531 A    2/1995   Smith
5,668,987 A    9/1997   Schneider
5,732,240 A    3/1998   Caccavale
6,128,701 A    10/2000  Malcolm et al.
6,952,664 B1*  10/2005  Lahiri et al. ............ 703/14
2003/0204698 A1* 10/2003 Sachedina et al. ........ 711/170

* cited by examiner

Primary Examiner—Matthew Kim
Assistant Examiner—Ryan Dare
(74) Attorney, Agent, or Firm—Gerald R. Woods, Esq.; Steven M. Greenberg, Esq.; Carey Rodriguez Greenberg & Paul LLP

(57) ABSTRACT

The present invention is a system, method and apparatus for self-tuning cache management. In a preferred aspect of the invention, a self-tuning cache can include a primary cache and at least two test caches. A first one of the test caches can have a cache size which is smaller than a size of the primary cache. A second one of the test caches can have a cache size which is greater than the size of the primary cache. A cache engine can be programmed to manage the primary cache and the test caches. importantly, a cache tuner can be coupled to the primary and test caches. The cache tuner can include a configuration for resizing the primary cache when one of the at least two test caches demonstrates cache performance which justifies resizing the primary cache.

25 Claims, 3 Drawing Sheets

SELF-TUNING CACHE

BACKGROUND OF THE INVENTION

1. Statement of the Technical Field

The present invention relates to cache memory management and more particularly to cache tuning.

2. Description of the Related Art

Memory cache technologies have formed an integral part of computer engineering and computer science for well over two decades. Initially embodied as part of the underlying hardware architecture of a data processing system, data caches and program instruction caches store often-accessed data and program instructions in fast memory for subsequent retrieval in lieu of retrieving the same data and instructions from slower memory stores. Consequently, substantial performance advantages have been obtained through the routine incorporation of cache technologies in computer main board designs.

Notably, the inherent principles of the data cache have been applied far beyond the realm of the computer main board. In this regard, caching technologies have been implemented across numerous computing systems ranging from soft database management systems, to hard drive controlling technologies. Data caching technologies have become particularly important in the context of content delivery systems in which often-requested content can be cached for frequent distribution to requesting computing clients.

In the prototypical content delivery system, content can be delivered from an origin server to a community of content consuming clients. Content typically can be delivered according to a request-response paradigm in which the content consuming clients initiate a request for content to which one or more origin servers can respond with the requested content. Generally, one or more content caches can be disposed in the intermediate communications path between the content consuming clients and content servers in order to enhance the responsiveness of the servers to any single client request and to reduce the processing burden placed upon the origin server.

Notably, it has been well-documented that the successful use of a cache can depend upon the size of the cache. Specifically, it is well-known that cache performance—namely the hit ratio of a cache—can vary non-linearly with the size of the cache. To account for this non-linear relationship, cache administrators generally perform manual cache tuning in order to optimize the performance of a cache by varying the size of the cache. The manual variance of the cache can be determined based upon the contemporarily experienced performance of the cache and the corresponding size of the cache when measuring the contemporary performance.

It will be recognized by the skilled artisan that manually tuning a cache can be difficult and inexact. Consequently, several automated cache tuning methods have been proposed. For example, in U.S. Pat. No. 5,732,240, the size of a cache can be dynamically modified and the resulting improvement in the hit rate can be measured. The cache size can be repeatedly changed until the resulting improvement falls negative. That is, when the "peak" improvement has been detected, the cache size can be considered optimal. Nevertheless, to reach the optimal cache size setting, one must "test" multiple cache size settings in a linear fashion and the process of reaching the optimal setting can be slow and inefficient.

To avoid the linear searching methodology of the '240 patent, several automatic cache tuning techniques utilize predictive algorithms designed to predict the likely performance of a cache based upon a hypothetical cache size setting. Similarly, some have tuned a cache to a particular size in order to achieve a desired cache hit rate without knowing a priori whether the selected cache size can achieve the desired hit rate. Analogously, cache tuning methodologies have computed a proper eviction strategy for cached objects based upon a proposed albeit unimplemented size of a cache. In all circumstances, though, the process of reaching an optimal cache size can be slow and inefficient.

SUMMARY OF THE INVENTION

The present invention addresses the deficiencies of the art in respect to cache tuning and provides a novel and non-obvious method, system and apparatus for self-tuning cache management. In a preferred aspect of the invention, a self-tuning cache can include a primary cache and at least two test caches. A first one of the test caches can have a cache size which is smaller than a size of the primary cache. A second one of the test caches can have a cache size which is greater than the size of the primary cache. A cache engine can be programmed to manage the primary cache and the test caches.

Importantly, a cache tuner can be coupled to the primary and test caches. The cache tuner can include a configuration for resizing the primary cache when one of the at least two test caches demonstrates cache performance which justifies resizing the primary cache. Advantageously, each of the test caches can include a configuration for storing cache keys for cacheable objects and corresponding placeholders for the cacheable objects in lieu of storing the cacheable objects. Preferably, the first one of the test caches can include a cache size which is half that of the primary cache. Similarly, the second one of the test caches can include a cache size which is double that of the primary cache.

A method for self-tuning an active cache can include managing the active cache by inserting, retrieving and evicting cacheable objects and corresponding caching keys in the active cache and by locating cached objects selected for retrieval from the active cache by reference to corresponding ones of the caching keys. The method further can include further managing a test cache by inserting and evicting in the test cache caching keys and dummy placeholders for cacheable objects not stored in the test cache and by locating in the test cache individual ones of the caching keys corresponding to requested ones of the cacheable objects. Notably, hit rates can be measured and compared for each of the active cache and the test cache. In this regard, if the measured hit rates compare such that a change in size for the active cache is justified, the active cache and the test cache can be resized.

In a preferred aspect of the invention, if the test cache is smaller in size than the active cache and if the test cache demonstrates a hit rate which does not differ significantly from a hit rate measured for the active cache, the active cache can be resized to a smaller size. Conversely, if the test cache is larger in size than the active cache and if the test cache demonstrates a hit rate which significantly exceeds a hit rate measured for the active cache, the active cache can be resized to a larger size. In either case, the resizing can be limited so as to not exceed a minimum and a maximum cache size for the active cache.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a self-tuning cache. In accordance with the present invention, a self-tuning cache can include both an active cache and one or more test caches. The active cache can include a configured cache size and can be managed according to conventional cache management methodologies. Each of the test caches similarly can be configured with a cache size, although the cache size of each test cache can differ from that of the active cache. Preferably, two test caches can be configured in association with the active cache. The first test cache can be configured with a cache size which is half that of the active cache. By comparison, the second test cache can be configured with a cache size which is double that of the active cache.

Importantly, each test cache need not store cache objects for subsequent retrieval by a cache management engine, as is the case with the active cache. Rather, each test cache merely can store a table of cache keys generated from cacheable objects in the active cache as requests for the cacheable objects are received both in the active cache and the test cache. Specifically, whereas the active cache can behave as a conventional cache in caching often-accessed data, each of the test caches need only store references or associations with often-accessed data so as to be able to determine whether requested data otherwise could be retrieved from the test cache, were the test cache to have stored the requested data. In this way, hit rates for each test cache can be measured without incurring the resource overhead of maintaining the data in each test cache.

Once the hit rates have been measured for both the active cache and the test caches, the hit rates can be compared as between the active cache and each individual test cache to determine the relative effectiveness of each test cache. In the event that the effectiveness of any of the test caches nearly is as effective as a larger sized active cache, the size of the active cache can be reduced. Similarly, in the event that the effectiveness of any of the test caches is substantially more effective than a smaller sized active cache, the size of the active cache can be increased. In either case, responsive to a resizing of the active cache, the size of each of the test caches can be adjusted so that the test cache size is either a fraction of the size of the resized active cache, or a multiple of the size of the active cache. Thus, in the preferred aspect of the invention, the first test cache size can be resized to half that of the active cache, while the second test cache size can be resized to double that of the active cache.

Figure 1:
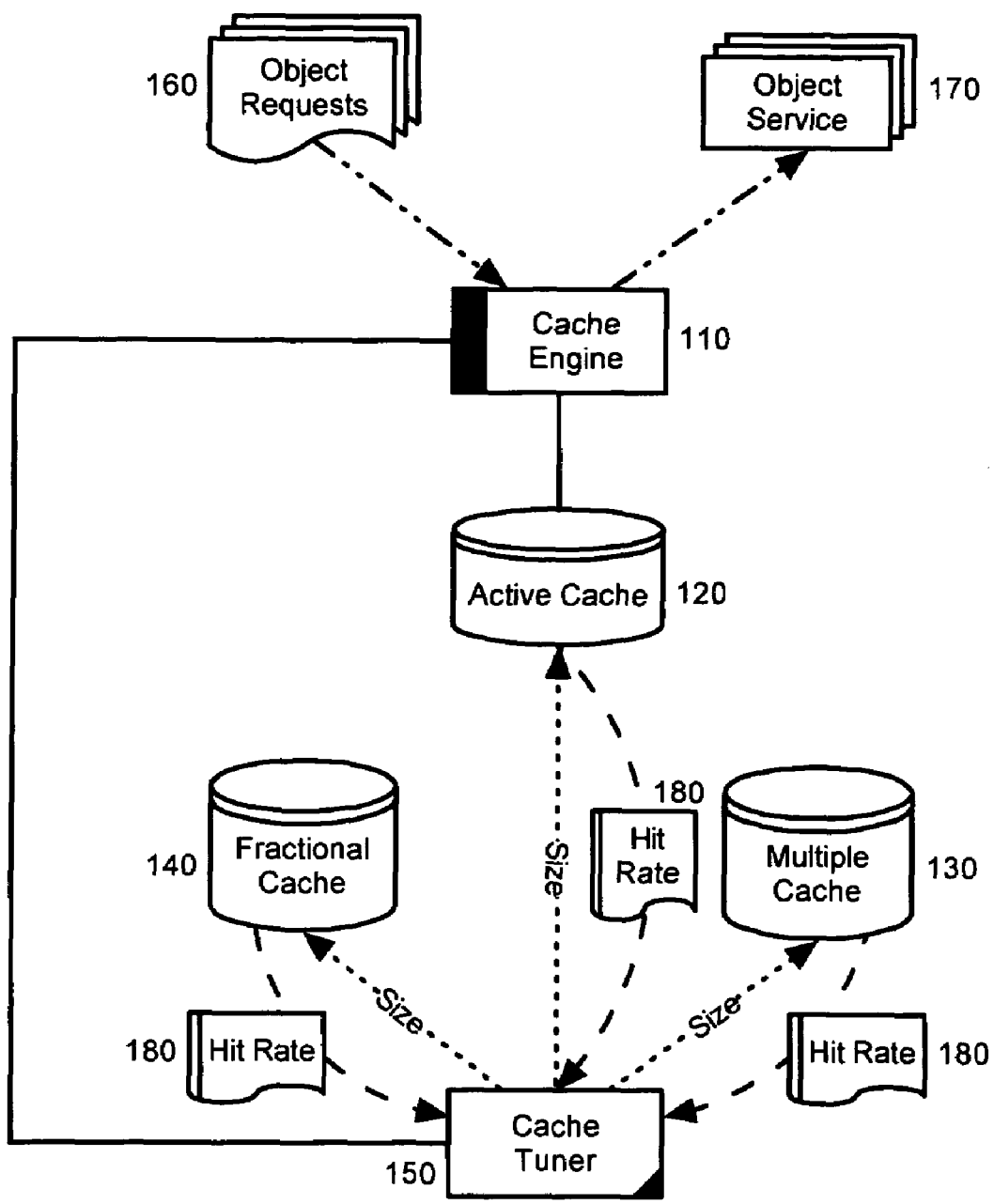
FIG. 1 is a schematic illustration of a self-tuning cache disposed in a cache management system.

In more particular illustration of the foregoing invention, FIG. 1 is a schematic illustration of a self-tuning cache disposed in a cache management system. The self-tuning cache can include a cache engine 110 configured to process object requests 160 by locating cached objects in an active cache 120 and by serving located ones 170 of the requested objects 160 to the requesting processes. A cache tuner 150 can be coupled to the active cache 120 which cache tuner 150 can establish a configured size for the active cache 120. Notably, one or more additional test caches 130, 140 (only two test caches shown for simplicity of illustration) can be coupled to the cache tuner 150. Preferably, the additional test caches 130, 140 can include a fractionally sized test cache 140 and a multiply sized test cache 130.

In accordance with the present invention, the cache tuner 150 can manage each of the test caches 130, 140 just as would be the case through the cache engine 110 with the exception that actual objects are not cached in the test caches 130, 140. Rather, cache keys can be generated for cached objects and stored in the test caches 130, 140 along with a dummy placeholder for the objects. Subsequently, when one of the object requests 160 is processed in one the test caches 130, 140, a key can be generated for the object request and each of the test caches 130, 140 can be inspected for a matching cache key just as would be the case with the active cache 120. Cache evictions also can be processed in the test caches 130, 140 as the cache evictions are processed in the active cache 120.

In any case, during a cache lookup, a cache key generated for a lookup object can be matched in the test caches 130, 140 just as the generated cache key can be applied to the active cache 120. Where a cache key match exists in one of the test caches 130, 140, it can be determined that, were the test caches 130, 140 to have stored the object, the object could have been retrieved. Of course, in reference to the active cache 120, the object associated with the matching cache key can be retrieved and returned to the requesting process. Regardless, it will be apparent to the skilled artisan that hit rates 180 can be computed not only for the active cache 120, but also for the test caches 130, 140 despite the storage of mere dummy data in the test caches 130, 140.

Importantly, once the hit rates 180 have been computed for the active cache 120 and each of the one or more test caches 130, 140, the hit rates 180 can be compared to determine which of the test caches 130, 140 demonstrates better performance than the active cache 120 and which of the test caches 130, 140 demonstrates inferior performance. In specific reference to a fractional test cache 140 which has been sized smaller than the active cache 120, in the event that the fractional test cache 140 demonstrates only marginally inferior performance, the size of the active cache 120 can be reduced so as to release computing resources consumed by the active cache 120. Conversely, in the event that the multiple test cache 130 demonstrates substantially better performance, the size of the active cache 120 can be increased in order to attain better performance despite the consumption of additional computing resources.

In either case, new cache sizes can be applied to the test caches 130, 140 once the active cache 120 has been re-sized. In this regard, the test caches 130, 140 can be resized proportionately to the newly sized active cache 120. As an example, the fractional test cache 140 can be resized to a fixed fractional size of the active cache 120 such as one-half the size of the active cache 120. Similarly, the multiple test cache 130 can be resized to a fixed multiple size of the active cache 120 such as double the size of the active cache 120. Importantly, to the extent that the fractional test cache 140 is a "half cache" while the multiple test cache 130 is a "double cache", the skilled artisan will recognize the principle of a binary search in the self-tuning cache in which an optimal cache size can be converged upon in a most efficient manner.

Figure 2:
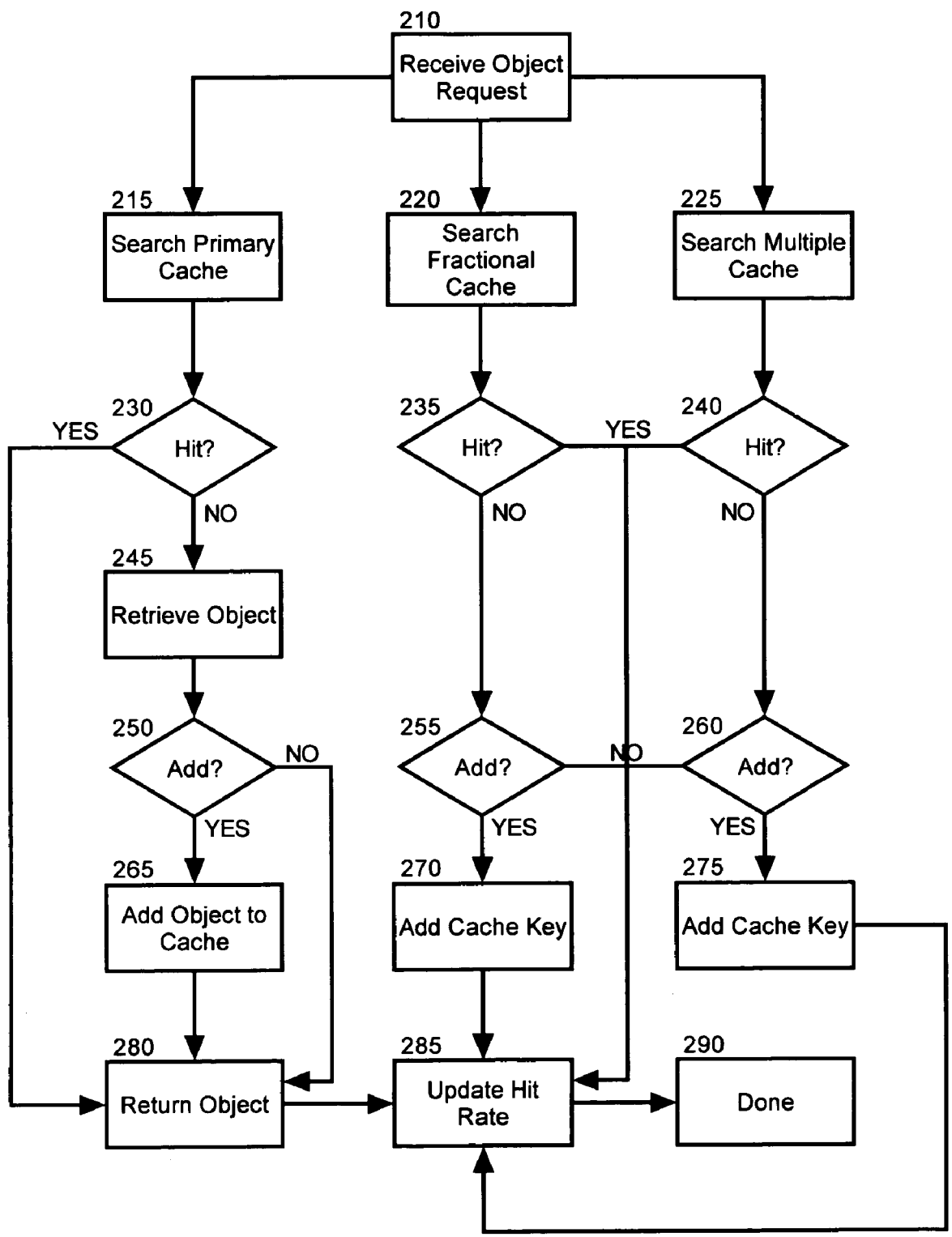
FIG. 2 is a flow chart illustrating a process for managing the self-tuning cache of FIG. 1; and, FIG. 3 is a flow chart illustrating a process for tuning the self-tuning cache of FIG. 1 according to cache metrics measured in the process of FIG. 2.

To further illustrate the management of the self-tuning cache, FIG. 2 is a flow chart illustrating a process for managing the self-tuning cache of FIG. 1. Beginning in block 210, an object request can be received for processing by the caching engine. Consequently, in block 215, the primary cache associated with the caching engine can be searched based upon a cache key produced for the object request. In decision block 230, if the requested object is located in the primary cache, in block 280 the requested object can be returned from the primary cache and in block 285 the hit rate measured for the primary cache can be adjusted to reflect a "hit".

In decision block 230, however, if the requested object cannot be located in the primary cache, in block 245 the requested object can be retrieved from its principal storage location. In decision block 250, if the caching engine determines that the retrieved object ought to be cached in the primary cache, the object can be added to the cache in block 265. In any case, the retrieved object can be returned in block 280 and the hit rate for the primary cache can be updated in block 285 to indicate a "miss". Finally, in block 290 the process can end.

Importantly, in addition to processing the object request in the primary cache in block 215, the object request also can be processed in both a fractional cache in block 220, and in a multiple cache in block 225. First considering the fractional cache, in block 220 the cache key for the object request can be applied to the fractional cache to locate the cache key in a key table in the fractional cache. If in decision block 235 the cache key can be located in the fractional cache, it can be concluded that, were the fractional cache to have stored the requested object, the fractional cache would have been successful in serving the requested object from the fractional cache despite the fractional size of the fractional cache. As a result, in block 285 the hit rate for the fractional cache can be updated to indicate a "hit".

On the other hand, if in decision block 235 the cache key cannot be located in the fractional cache, in block 255 it can be determined whether to add the cache key and corresponding dummy data to the fractional cache based upon the size of the fractional cache. If so, the cache key can be added to the fractional cache in block 270 as can dummy data which can act as a placeholder for the actual data that otherwise would have been cached in the fractional cache. In any case, regardless of whether the cache key is added to the fractional cache, in block 285 the hit rate for the fractional cache can be updated to indicate a "miss".

Similar to the fractional cache, the object requests also can be processed in the multiple cache beginning in block 225. In particular, in block 225 the cache key for the object request can be applied to the multiple cache to locate the cache key in a key table in the multiple cache. If in decision block 240 the cache key can be located in the multiple cache, it can be concluded that, were the multiple cache to have stored the requested object, the multiple cache would have been successful in serving the requested object from the multiple cache in consequence of the multiple size of the multiple cache. As a result, in block 285 the hit rate for the multiple cache can be updated to indicate a "hit".

On the other hand, if in decision block 240 the cache key cannot be located in the multiple cache, in block 260 it can be determined whether to add the cache key and corresponding dummy data to the multiple cache based upon the size of the multiple cache. If so, the cache key can be added to the multiple cache in block 275 as can dummy data which can act as a placeholder for the actual data that otherwise would have been cached in the multiple cache. In any case, regardless of whether the cache key is added to the multiple cache, in block 285 the hit rate for the fractional cache can be updated to indicate a "miss" and the process can end in block 290.

Figure 3:
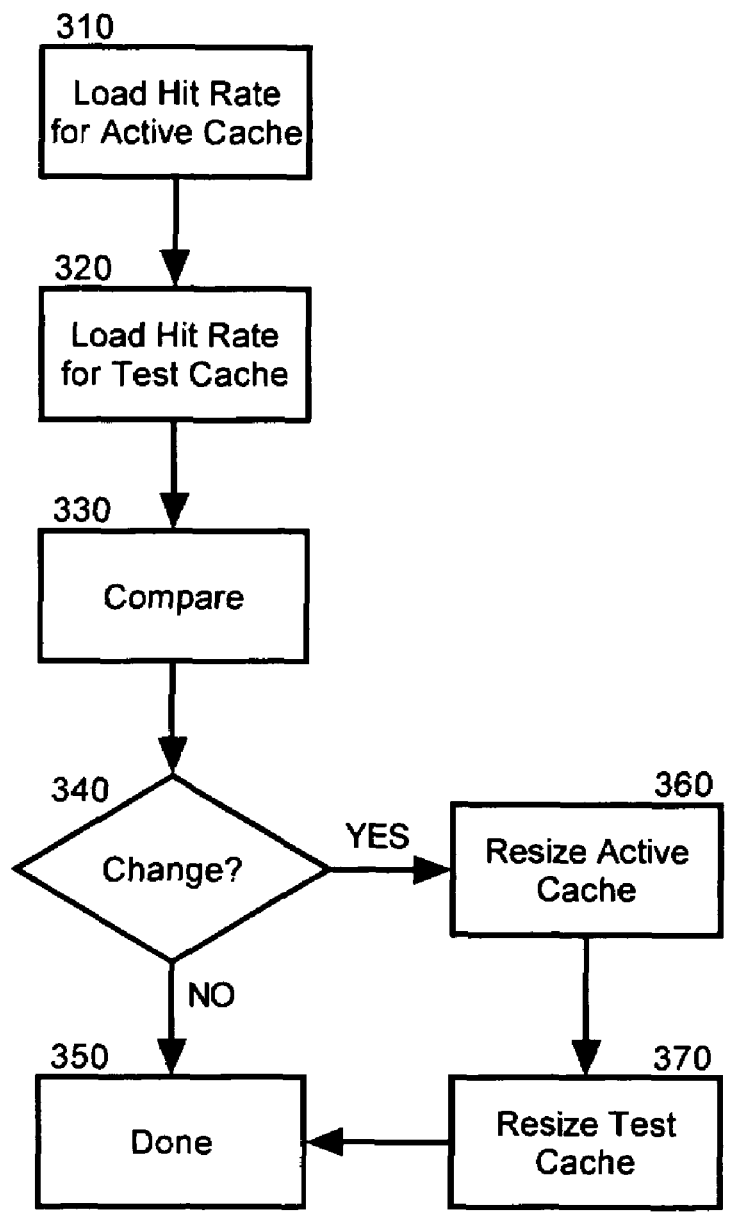

Once the hit rates for each of the primary and test caches have been computed, the primary cache can self-tune in accordance with the present invention. Specifically, FIG. 3 is a flow chart illustrating a process for tuning the self-tuning cache of FIG. 1 according to cache metrics measured in the process of FIG. 2. Beginning in block 310, the hit rate for the primary or active cache can be loaded as can the hit rate for a test cache. Notably, in a preferred embodiment, the hit rates for the primary and test caches can be inspected periodically only for the most recent data collected in order to avoid responding to anomalous or stale traffic patterns. In any event, in block 330, the hit rates can be compared. Based upon the comparison, In decision block 340 it can be determined whether to change the configuration of the primary cache.

For example, if the test cache is sized to a fraction of the size of the primary cache and further if the performance of the test cache differs only slightly from the performance of the primary cache, one can conclude that the additional resources consumed to support a larger sized cache provides little performance return. Thus, the test cache can be considered to be of a more optimal size than the primary cache. Conversely, if the test cache is sized to a multiple of the size of the primary cache and further if the performance of the test cache differs substantially from the performance of the primary cache, one can conclude that the additional resources consumed to support a larger sized cache provides a significant performance return. Thus, the test cache again can be considered to be a more optimal size than the primary cache.

If in decision block 340, it is determined that a change to the size of the primary cache would be desirable, in block 360 the size of the primary cache can be incremented. The change in size can range from applying the size of the test cache to the primary cache, to applying a size intermediate to the size of the test cache and to the primary cache, to merely incrementing or decrementing the size of the primary cache by a fixed amount or by a percentage of size. In addition to resizing the primary cache, in block 370 the test cache also can be resized to a size which is either a fraction of or a multiple of the primary cache, as the case may be. Finally, in block 350 the process can end.

It will be recognized by the skilled artisan that a larger change in size can produce more dramatic results in the near term, but can cause more frequent resizing as the workload experienced by the primary cache changes over time. Notably, in a preferred aspect of the invention, the resizing of the primary cache can be limited to absolute maximum and minimum values to prevent runaway or degenerate caches, respectively. Finally, it will be understood that a resizing of the primary cache can require the rearrangement of internal data structures supporting the operation of the primary cache. For instance, a hash based cache may require the augmentation of the number of hash buckets in the cache along with an increase in cache size.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A self-tuning cache comprising:
    a primary cache;
    at least two test caches, a first one of said test caches having a cache size which is smaller than a size of said primary cache, and a second one of said test caches having a cache size which is greater than said size of said primary cache;
    a cache engine programmed to manage said primary cache and said at least two test caches; and,
    a cache tuner coupled to said primary and test caches, said cache tuner comprising a configuration for resizing said primary cache when one of said at least two test caches demonstrates cache performance which justifies resizing said primary cache.

2. The self-tuning cache of claim 1, wherein each of said at least two test caches comprise a configuration for storing cache keys for cacheable objects and corresponding placeholders for said cacheable objects in lieu of storing said cacheable objects.

3. The self-tuning cache of claim 1, wherein said first one of said test caches comprises a cache size which is half that of said primary cache.

4. The self-tuning cache of claim 3, wherein said second one of said test caches comprises a cache size which is double that of said primary cache.

5. The self-tuning cache of claim 1, further comprising a maximum limit and a minimum limit for resizing said primary cache.

6. A method for self-tuning an active cache, the method comprising the steps of:
    managing the active cache by inserting, retrieving and evicting cacheable objects and corresponding caching keys in the active cache and by locating cached objects selected for retrieval from the active cache by reference to corresponding ones of said caching keys;
    further managing a test cache by inserting and evicting in said test cache caching keys and dummy placeholders for cacheable objects not stored in said test cache and by locating in said test cache individual ones of said caching keys corresponding to requested ones of said cacheable objects;
    measuring and comparing hit rates for each of said active cache and said test cache; and,
    if said measured hit rates compare such that a change in size for the active cache is justified, resizing the active cache and said test cache.

7. The method of claim 6, wherein said resizing step comprises:
    if said test cache is smaller in size than the active cache and if said test cache demonstrates a hit rate which does not differ significantly from a hit rate measured for the active cache, resizing the active cache to a smaller size.

8. The method of claim 6, wherein said resizing step comprises:
    if said test cache is larger in size than the active cache and if said test cache demonstrates a hit rate which significantly exceeds a hit rate measured for the active cache, resizing the active cache to a larger size.

9. The method of claim 6, further comprising the step of limiting said resizing so as to not exceed a minimum and a maximum cache size for the active cache.

10. The method of claim 6, further comprising the step of rearranging a data structure for the active cache based upon a change in size for the active cache.

11. A method for self-tuning an active cache, the method comprising the steps of:
    receiving a request to retrieve an object;
    generating a cache key for said object;
    searching the active cache for said object using said generated cache key;
    further searching at least one test cache for a stored cache key which matches said generated cache key;
    returning said object from the active cache if said object is located in the active cache in said searching step;
    updating hit rate statistics for each of the active cache and said at least one test cache based upon whether said object is located in the active cache in said searching step, and whether said generated cache key matches a stored cache key in said at least one test cache; and,
    determining whether to resize the active cache based upon said updated hit rate statistics.

12. The method of claim 11, wherein said determining step comprises the step of:
    if said at least one test cache is smaller in size than the active cache and if said at least one test cache demonstrates a hit rate which does not differ significantly from a hit rate measured for the active cache, resizing the active cache to a smaller size.

13. The method of claim 11, wherein said determining step comprises the step of:
    if said at least one test cache is larger in size than the active cache and if said at least one test cache demonstrates a hit rate which significantly exceeds a hit rate measured for the active cache, resizing the active cache to a larger size.

14. The method of claim 11, further comprising the step of evicting stored cache keys from said at least one test cache.

15. The method of claim 11, further comprising the step of inserting a generated cache key into said at least one test cache.

16. A machine readable storage having stored thereon a computer program for self-tuning an active cache, the computer program comprising a routine set of instructions which when executed by a machine cause the machine to perform the steps of:
    managing the active cache by inserting, retrieving and evicting cacheable objects and corresponding caching keys in the active cache and by locating cached objects selected for retrieval from the active cache by reference to said caching keys;

further managing a test cache by inserting and evicting in said test cache caching keys and dummy placeholders for cacheable objects not stored in said test cache and by locating in said test cache individual ones of said caching keys corresponding to requested ones of said cacheable objects;

measuring and comparing hit rates for each of said active cache and said test cache; and, if said measured hit rates compare such that a change in size for the active cache is justified, resizing the active cache and said test cache.

17. The machine readable storage of claim 16, wherein said resizing step comprises:

if said test cache is smaller in size than the active cache and if said test cache demonstrates a hit rate which does not differ significantly from a hit rate measured for the active cache, resizing the active cache to a smaller size.

18. The machine readable storage of claim 16, wherein said resizing step comprises:

if said test cache is larger in size than the active cache and if said test cache demonstrates a hit rate which significantly exceeds a hit rate measured for the active cache, resizing the active cache to a larger size.

19. The machine readable storage of claim 16, further comprising the step of limiting said resizing so as to not exceed a minimum and a maximum cache size for the active cache.

20. The machine readable storage of claim 16, further comprising the step of rearranging a data structure for the active cache based upon a change in size for the active cache.

21. A machine readable storage having stored thereon a computer program for self-tuning an active cache, the computer program comprising a routine set of instructions which when executed by a machine cause the machine to perform the steps of:

receiving a request to retrieve an object;

generating a cache key for said object;

searching the active cache for said object using said generated cache key;

further searching at least one test cache for a stored cache key which matches said generated cache key;

returning said object from the active cache if said object is located in the active cache in said searching step;

updating hit rate statistics for each of the active cache and said at least one test cache based upon whether said object is located in the active cache in said searching step, and whether said generated cache key matches a stored cache key in said at least one test cache; and, determining whether to resize the active cache based upon said hit rate statistics.

22. The machine readable storage of claim 21, wherein said determining step comprises the step of:

if said at least one test cache is smaller in size than the active cache and if said at least one test cache demonstrates a hit rate which does not differ significantly from a hit rate measured for the active cache, resizing the active cache to a smaller size.

23. The machine readable storage of claim 21, wherein said determining step comprises the step of:

if said at least one test cache is larger in size than the active cache and if said at least one test cache demonstrates a hit rate which significantly exceeds a hit rate measured for the active cache, resizing the active cache to a larger size.

24. The machine readable storage of claim 21, further comprising the step of evicting stored cache keys from said at least one test cache.

25. The machine readable storage of claim 16, further comprising the step of inserting a generated cache key into said at least one test cache.

* * * * *